United States Patent [19]
Mazhar

[11] Patent Number: 6,076,580
[45] Date of Patent: Jun. 20, 2000

[54] MULTI-CHAMBER PRESSURIZABLE TUBE FOR A TIRE

[76] Inventor: Mohammad S. Mazhar, 3537 Jasper, Sterling Heights, Mich. 48310

[21] Appl. No.: 08/105,984

[22] Filed: Aug. 10, 1993

[51] Int. Cl.[7] .................................................. B60C 5/24
[52] U.S. Cl. ..................... 152/338.1; 152/333.1
[58] Field of Search ............................. 152/338.1, 333.1, 152/331.1, 337.1

[56] References Cited

U.S. PATENT DOCUMENTS

| | | | |
|---|---|---|---|
| 581,210 | 4/1897 | d'Infreville ........................... | 152/338.1 |
| 921,151 | 5/1909 | Parsons ................................. | 152/338.1 |
| 1,051,738 | 1/1913 | Kavanagh ............................ | 152/338.1 |
| 2,253,230 | 8/1941 | Feldman ............................... | 152/338.1 |

FOREIGN PATENT DOCUMENTS

| | | | |
|---|---|---|---|
| 11378 | 11/1893 | United Kingdom ................. | 152/338.1 |

*Primary Examiner*—Adrienne C. Johnstone
*Attorney, Agent, or Firm*—David L. Kuhn; Peter A. Taucher

[57] ABSTRACT

Disclosed is a pressurizable inner multi chambered tube for a tire having resilient radial walls in the body sealingly the chambers from one another. A ring shaped manifold on the tube communicates to the chambers by a check valve at each chamber, the check valves permitting fluid flow from the manifold to the chambers but preventing flow in the reverse direction. A valveless fluid passing fixture on the manifold permits the manifold to be connected to a source of pressurized air. If one chamber of the tube looses pressure, the remaining tubes will expand in an angular, circumferential direction and slide on the manifold so as to take up space formerly occupied by the one, depressurized chamber. The check valves of the remaining chambers will be released from engagement as the remaining chambers slide on the manifold.

4 Claims, 3 Drawing Sheets

MULTI-CHAMBER PRESSURIZABLE TUBE FOR A TIRE

GOVERNMENT USE

The invention described herein may be manufactured, used and licensed by or for the U.S. Government for governmental purposes without payment to me of any royalty thereon.

BACKGROUND AND SUMMARY

For many years the U.S. Army and other military organizations have used so called "run flat" tires on combat vehicles, these tires functioning for a limited time after being punctured. Known run flat tires are typically much heavier and more complex than other tires, and run flat tires often need to be mounted on specially designed wheels. To address these concerns, I have invented a novel inner tube for standard automotive vehicle tires that will give such tires a run flat capability. My tube results in a run flat tire that is lighter, less complex and cheaper than known run flat tires.

My inner tube has a body divided by radial walls into adjoining arcuate chambers and has a flexible body wall portion surrounding each of the chambers. A ring-shaped manifold on the body has a check valve at each of the chambers for communicating the chambers with the manifold. The check valves allow air flow from the manifold to the chambers but not from the chambers to the manifold. My tube has valve engagement means for releasably locking the check valves to the manifold so that the chambers are free to slide on the manifold once the manifold is depressurized. When one of the chambers loses pressure, the remaining chambers move within the tire to take up a portion of the space formerly occupied by the depressurized chamber.

DETAILED DESCRIPTION

Figure 1:
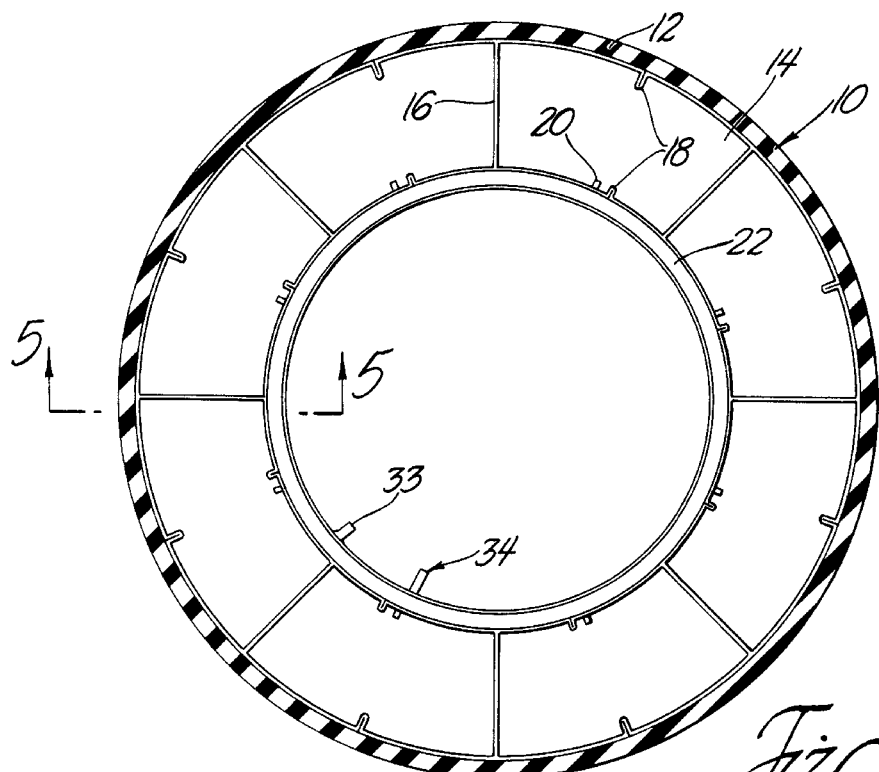
FIG. 1 is a sectional view of my tube installed in a tire.

FIG. 1 shows an inner, multi chamber tube 10 of elastomeric material within a tire 12 of conventional construction. Tube 10 has a hollow toroidal configuration separated into a plurality of arcuate chambers 14 by radial walls 16, which are flexible but somewhat resilient. The tube preferably has a smooth exterior surface that slides on the inner peripheral surface of tire 10 and a suitable lubricant may be used between the tube and tire to promote sliding therebetween. Each chamber 14 is encircled by an annular expansion fold 18, which allows the chambers to lengthen in the circumferential direction under circumstances described later.

Figure 5:
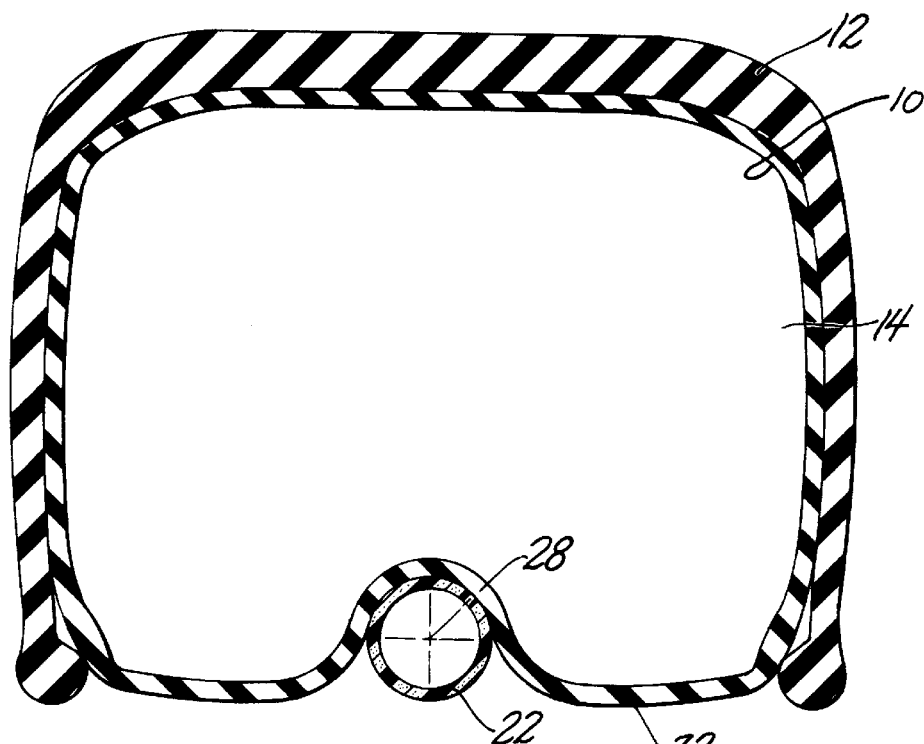
FIG. 5 is a view taken along line 5—5 in FIG. 1.
Figure 6:
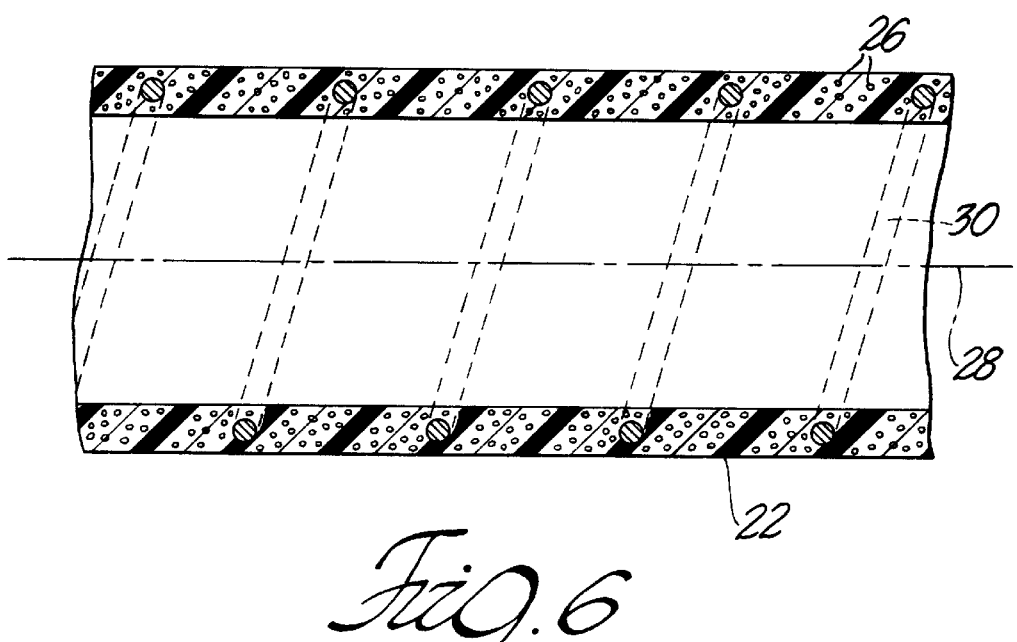
FIG. 6 is a sectional view of a portion of the manifold showing optional structural details of the manifold.

Each chamber 14 has a one-way, or check, valve 20 by which air or other gas is admitted to the chamber from ring manifold 22 but gas is not permitted to escape the chamber. As best seen in conjunction with FIG. 5, ring manifold 22 is disposed within an annular recess at the inner diameter of tube 10. Ring manifold 22 preferably has resistance to deformation or crushing toward axis 28 while being flexible at the zones 24 (FIG. 3) immediately surrounding valves 20. One way to provide such resistance to deformation is by using elongate reinforcing members oriented circumferentially or spirally relative to a longitudinal axis 28 of manifold 22 parallel to tube 10. Exemplifying appropriate reinforcing members are fiberglass members shown schematically at 26 and disposed circumferentially or spirally about longitudinal axis 28 of manifold 22 in FIG. 6. Another example of a reinforcing member, shown in both FIGS. 5 and 6, is a spring 30 embedded in the wall of manifold 22 and spiralling about axis 28.

Referring again to FIG. 5, the diametrically inner exterior surface 32 of tube 10 partially surrounds ring manifold 22 and will face an annular surface of a wheel (not shown) on which tire 12 is installed. Surface 32 is preferably smooth and slippery, and a suitable lubricant may be applied thereto in order to promote slipping between the tube and manifold 22, and to promote slipping between the tube and the wheel's annular surface. It is preferred that ring manifold 22 be fixed relative to the wheel when the tire is mounted to the wheel.

Figure 4:
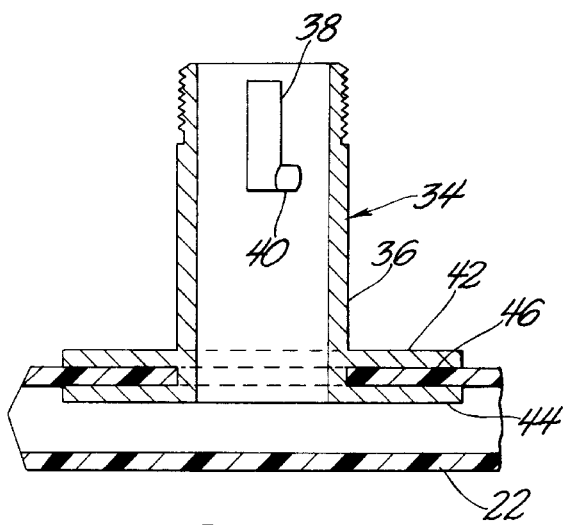
FIG. 4 is a sectional view of a fluid intake fixture of the manifold.

Returning to FIG. 1, ring manifold 22 is provided with intake fixture 34 by which pressurized air can enter the manifold from a suitable source. As seen in FIG. 4, fixture 34 has a duct 36 that is essentially a simple, cylindrical tube with no valve elements therein. At the base of duct 36 are parallel flanges 42 and 44 which sealingly clamp portion 46 of the wall of ring manifold 22 therebetween and at the tip of duct 36 are external threads by which a cap (not shown) can be placed on fixture 34. Optionally, there may be provided a valve actuation post 38 centered in duct 36 and fixed therein by member 40. Post 40 will depress a stem of the air valve in a hose end fitting (not shown) when the hose end fitting engages fixture 34, whereby the air valve then opens to admit pressurized air from the hose to fixture 34.

As seen in FIG. 1, manifold 22 is provided with a pressure relief valve 33 of conventional construction, valve opening when the pressure in manifold 22 is higher than that which is desired for chambers 14. It is highly preferred that a pressure relief valve be in manifold 22 instead of in each of the individual chambers 14 because such a valve in the manifold eliminates the need for multiple pressure relief valves. Further, relief valves in the chambers pose a potential problem when bumps to tire 12 during travel over rough terrain temporarily increase pressure in the chambers. The chambers' relief valves will release gas in response to temporary pressure increases but afterward, the chambers' pressure will be too low.

Figure 3:
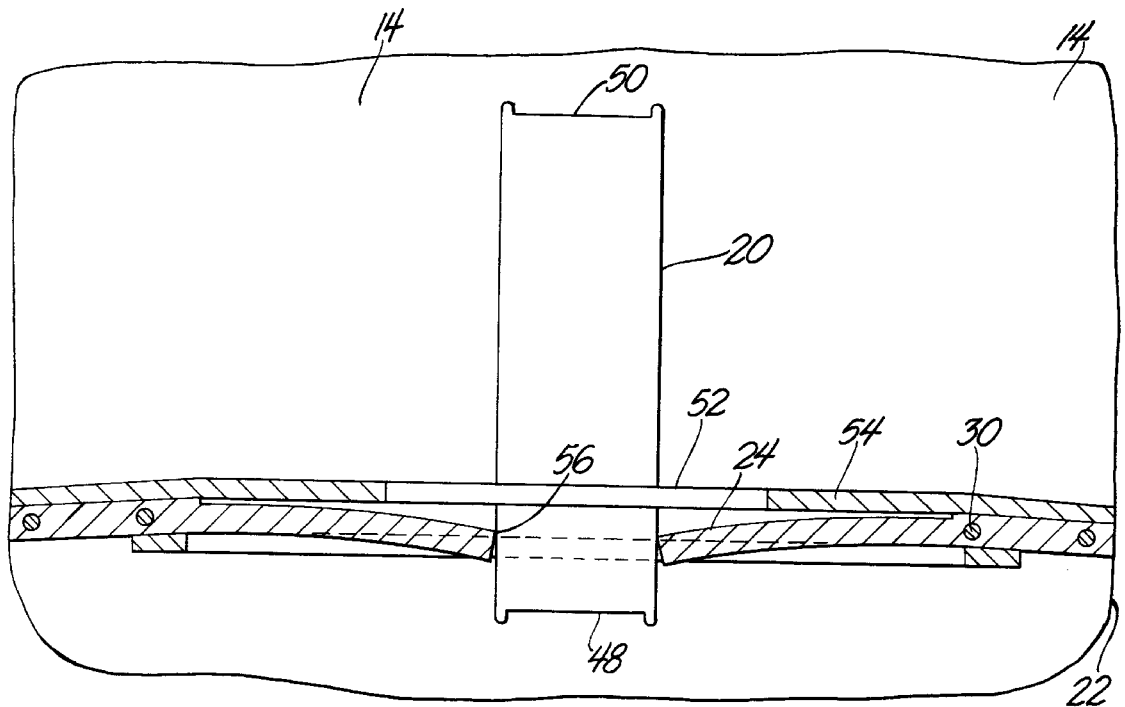
FIG. 3 is a partial sectional view showing details of the structure surrounding a check valve that communicates the manifold of the tube with one of the chambers of the tube.

FIG. 3 shows details in section of the structure surrounding check valve 20, but for convenience the interior of valve 20 is not shown either in section or by hidden lines, it being understood that the interior of valve 20 is of conventional design. The inlet end 48 of valve 20 protrudes into ring manifold 22 through flexible zone 24 of the manifold wall, and the outlet end 50 of valve 20 lies within chamber 14. A rigid, flat toroidal flange 52 encircles valve 20 and faces zone 24 and is fixed to wall sector 54 of chamber 14 by adhesive, fusion or other known, suitable means.

It will be noted that flexible zone 24 flares away from flange 22 into manifold 22 in a radially inward direction relative to valve 20. Flexible zone 24 defines an annular surface, an edge portion 56 of which very slightly interferes with and seals with valve 20. Gas under pressure in manifold 22 will tend to bend the radially inner part of zone 24 upward, so that zone 24 interferes with, grips and seals valve 20 more tightly under the increased pressure occurring when intake fixture 34 receives gas from a pressurized source. After pressure in manifold 20 is released, zone 24 returns to its relaxed, FIG. 3 position. In the absence of the aforementioned pressure, the friction between valve 20 and zone 24 so low that valve 20 can be slid out of or into manifold 22 through zone 24.

Figure 2:
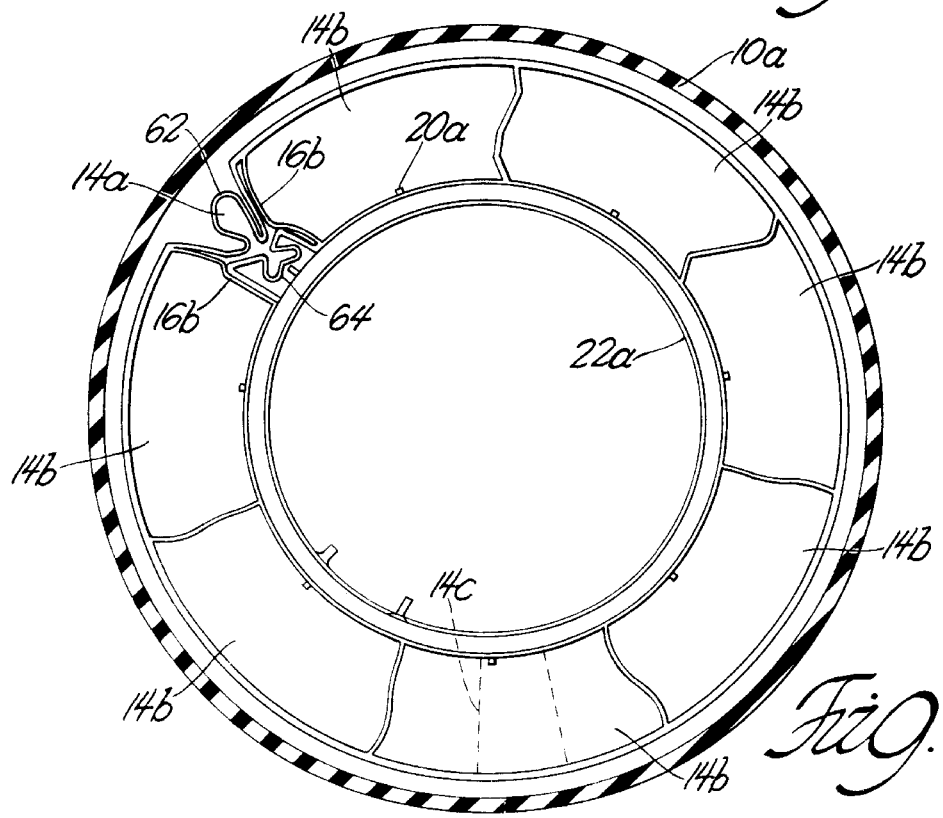
FIG. 2 is a sectional view of my tube installed in a tire wherein one of the chambers of the tube has been depressurized, as by a leak or rupture.

FIG. 2 shows a tube 10a constructed in the same manner as tube 10 except that a chamber 14a of tube 10a has collapsed due to a rupture or leak. Chambers 14b of tube 10a have elongated and slid to take up most of the circumferential, arcuate space formerly occupied by chamber 14a, and check valves 20a will have been pulled loose from ring manifold 22a. The resilient radial chamber walls 16a bordering chamber 14a are now closer together than any other pair of radial chamber walls and will thereby effect enhanced reenforcement against radial compression of tube 10a at chamber 14a. Outer chamber wall 62 and inner chamber wall 64 may have, when in their convoluted FIG. 2 condition, a radial resilience comparable to sector 14c of properly pressurized chamber 14b. The angular dimension of sector 14c is equal to that of chamber 14a.

I do not desire to be limited to the exact details of construction or method shown herein since obvious modifications will occur to those skilled in the relevant arts without departing from the spirit and scope of the following claims.

What is claimed is:

1. A pressurizable inner tube for a tire, comprising:

an annular body defining a plurality of adjoining arcuate chambers;

resilient radial walls in the body sealingly separating the chambers from one another;

a flexible body wall portion surrounding each of the chambers;

a ring-shaped manifold engaged to the body;

a check valve at each of the chambers communicating the chambers with the manifold, the check valves permitting fluid flow from the manifold to the chambers but preventing fluid flow from the chambers to the manifold;

valve engagement means for releasably locking the check valves to the manifold;

means for admitting fluid to the manifold.

2. The tube of claim 1 further comprising:

expansion folds in the body wall portions, the folds encircling the chambers;

means to promote angular sliding of the body in the tire on the manifold.

3. The tube of claim 1 further including a pressure limiting relief valve only in the manifold.

4. The tube of claim 1 wherein the body wall portions are made of resilient material.

* * * * *